Figure 1:
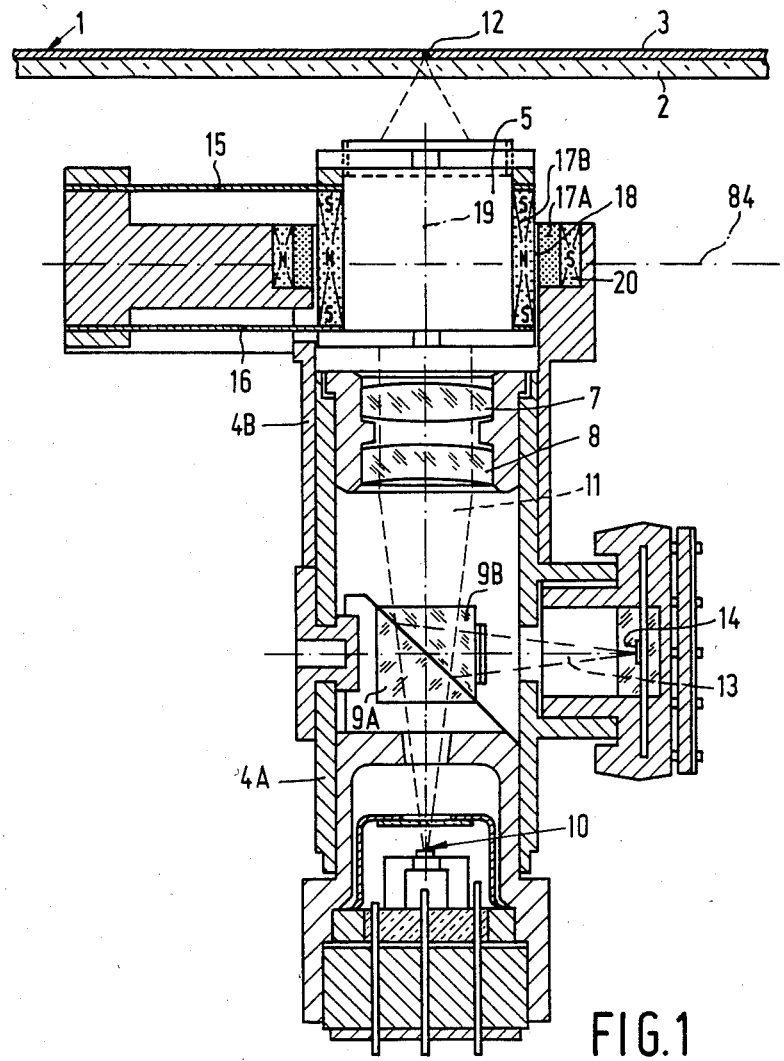

United States Patent [19]
van Rosmalen

[11] Patent Number: 4,557,564
[45] Date of Patent: Dec. 10, 1985

[54] MOVABLE SCANNING UNIT FOR AN OPTICAL RECORDING OR PLAYBACK APPARATUS

[75] Inventor: Gerard E. van Rosmalen, Eindhoven, Netherlands

[73] Assignee: U.S. Philips Corporation, New York, N.Y.

[21] Appl. No.: 570,320

[22] Filed: Jan. 13, 1984

[30] Foreign Application Priority Data

Oct. 27, 1983 [NL] Netherlands ......................... 8303700

[51] Int. Cl.[4] .............................................. G02B 7/04
[52] U.S. Cl. .................................... 350/247; 350/255
[58] Field of Search .............................. 350/247, 255; 369/44-45

[56] References Cited
U.S. PATENT DOCUMENTS 4,449,213  5/1984  Noborimoto et al. ................. 369/45

FOREIGN PATENT DOCUMENTS

EP53476   6/1982  European Pat. Off. .............. 369/45
53835     3/1982  Japan .................................... 369/44
208641   12/1982  Japan .................................... 350/247

*Primary Examiner*—William H. Punter
*Attorney, Agent, or Firm*—Robert T. Mayer; Algy Tamoshunas

[57] ABSTRACT

An electro-optical device for reading an information disc comprises an optical system which is movable relative to the disc by at least one electro-magnetic actuator. The optical system is supported by elongated members whose length is great relative to their thickness and which are pretensioned in the longitudinal direction by magnets which cooperate with each other via an air gap, enabling the use of very flexible supporting elements, for example guys which have a low resistance to bending and a very low mass.

18 Claims, 11 Drawing Figures

MOVABLE SCANNING UNIT FOR AN OPTICAL RECORDING OR PLAYBACK APPARATUS

The invention relates to an electro-optical device for scanning an information disc without mechanical contact, which device comprises: a movable optical system comprising at least one optical element; supporting means which movably support the optical system and which are long in relation to their thickness; and an electromagnetic actuator comprising first actuator means and second actuator means which cooperate electromagnetically with each other via an air gap for moving the optical system in a controlled fashion.

Electro-optical devices of this type are known in a variety of versions, for example from European Patent Application No. 0077581 corresponding to U.S. Pat. No. 4,453,241 (herewith incorporated by reference). The electro-optical device described therein is intended for use with a swinging-arm device for writing and/or reading recording tracks in a recording surface of a rotating optical disc by means of a radiation beam which is emitted by a laser and which is concentrated to form a radiation spot. Such a swing arm device is disclosed in European Patent Application No. 0074131 corresponding to U.S. Pat. No. 4,403,316, herewith incorporated by reference. The optical system comprises a plurality of lenses which, in combination with some lenses which are rigidly connected to the frame, constitute the objective of the electro-optical device. The flexible supporting means comprise two flat leaf springs, which are spaced from one another, extend at least substantially parallel to one another, and each have one of their ends connected to the moving optical system, the other end being rigidly secured to the frame. Hence, the term "frame" is to be understood to mean the housing of an integrated optical pick-up which comprises the optical system, which entire pick-up can be mounted in the swinging arm of said swinging-arm device.

The optical system is supported by the leaf springs so as to be movable back and forth along the optical axis of the system in order to keep the radiation spot constantly focused on the information structure of the optical disc. In order to enable the tracks on the disc to be followed in the radial direction, the whole swinging arm is driven, which means that the pivotal movements of the swinging arm must be transmitted to the optical system via the leaf springs. Therefore, the leaf springs must satisfy conflicting requirements. The focusing movements not only require energy for accelerating and decelerating the mass of the optical system and of the annular magnet surrounding this system, but also energy for the deflection of the springs. In order to minimize the thermal dissipation in the actuator coil which is arranged on the frame and the dimensioning of the amplifiers in the servo system which controls the focusing movements of the optical system, weak leaf springs should be used. For transmitting the radial movements to the optical system, however, the leaf springs should be as stiff as possible. This means that for the focusing movements the leaf springs must be weak but in a direction transverse thereto they must be stiff, which requirements can be met partly by making the plate springs thin but sufficiently wide. Another requirement is that the leaf springs must have a minimal mass and must not be in resonance at the frequencies of movement of the optical system.

It is the object of the invention to provide an electro-optical device of the type specified in the opening paragraph, which device meets the conflicting requirements imposed on the supporting means in a better manner. The this end, the invention is characterized in that there is provided a magnetic pretensioning device comprising first pretensioning means on the frame and second pretensioning means on the optical system. The first and second pretensioning means cooperate magnetically with one another via an air gap and pretension said supporting means in the longitudinal direction. The pretensioning means can provide an adequate resistance to movements in the transverse direction even when thin leaf springs are employed. The magnetic pretensioning means may be considered to form part of the supporting means which support the optical system movably on the frame. The force-displacement characteristic of the supporting means may be influenced by the choice of the magnetic pretensioning means, enabling a more linear characteristic to be obtained.

Preferably, the magnetic pretensioning device comprises permanent-magnetic means, because permanent magnets do not require a power supply. However, in principle it is alternatively possible to utilize electromagnets or a combination of electromagnets and permanent-magnets. An advantageous embodiment is characterized in that at least a part of the pretensioning means also form part of the actuator means. This part of the actuator means then performs two functions, so that only a few or no additional parts are required.

The significance of the invention is such that it enables an entirely new generation of electro-optical devices of the type specified in the opening paragraph to be developed. This new generation of electro-optical devices is characterized in that said flexible supporting means comprise wires having a low resistance to bending for supporting electromagnetically movable optical systems. The term "wire" as used herein is intended to refer broadly to a metallic or nonmetallic guy comprised of a single fiber or a plurality of fibers.

As described in the afore-mentioned U.S. Pat. No. 4,453,241, the movable optical system may comprise for example a lens system with an optical axis. A "lens system" is to be understood to mean an optical system comprising at least a single lens. When a lens system is supported by means of wires having a low resistance to bending, it may be necessary to make provisions which preclude tilting of the system about an axis perpendicular to the optical axis. An embodiment of the invention which is advantageous in this respect is characterized in that the supporting means comprise two pairs of wires which extend at least substantially transversely of the optical axis, a first pair extending near a first end and a second pair near a second end of the lens system, and the wires of each pair are disposed at an angle to one another. The resistance to tilting presented by the supporting means is caused by the fact that, because the wires are disposed at an angle to each other and hence have to describe different arcs during tilting of the optical system, the optical system can be tilted only if a tilting torque of such a magnitude is exerted that a torque limit is exceeded, necessary to overcome the pretensioning stresses in the wires. This embodiment may further be characterized in that: the first pair of wires meet at a first point of attachment; the second pair of wires meet at a second point of attachment and the first and the second point of attachment are spaced from each other and are situated on a pivotal axis parallel to the optical axis of the lens system. Thus, also if two wires are used on each side, only two points of attachment for the wires are required. Moreover, the lens system moves along an arc of a circle, which permits the stationary part of the device to be optimized in respect of production engineering. A further advantage is that in comparison with parallel wires, the present arrangement results in a higher resistance to undesired pivotal movements of the lens system about axes which extend through and are perpendicular to the optical axis and the pivotal axis. This will be explained more fully hereinafter.

The known swinging-arm device described in the afore-mentioned U.S. Pat. No. 4,403,316 requires the use of an expensive supporting arrangement for the swinging arm and, in addition, a supporting arrangement for supporting the lens system on the swinging arm. The steps described in the last-mentioned patent enable a swinging-arm device to be obtained which constantly follows radial oscillations of the track which occur in every revolution by means of only one servo-system, referred to as a single-stage servo-system. This means that the lens system is not controlled separately in a radial direction relative to the swinging arm. The entire swinging arm is incorporated in a servo loop for rapid tracking. The dynamic bandwidth of the swinging-arm device must comply with stringent requirements, which can be met only with difficulty. The invention enables the known swinging arm device to be replaced completely by an electro-optical device having a very high bandwidth and a smaller number of parts. For this purpose, another embodiment of the invention is used which has the characteristic features of the last-mentioned embodiment and which in addition, is characterized in that: the lens system is pivotable about the pivotal axis along an arc whose chord has a length which is at least equal to the diametral dimension of the annular information area of the information disc to be read, and the first actuator means have the shape of an arc whose center of curvature is situated on the pivotal axis and cooperate with the second actuator means via an at least substantially constant air gap, regardless of the pivotal position of the lens system. This embodiment of the invention, by means of which a rotating optical disc can be scanned completely without the use of a further servo-controlled radially movable device comprises only one moving part in the form of a lens system which is supported by wires which are pretensioned in a contactless manner.

The invention may also be used in an advantageous manner in electro-optical devices of a different type, for example as described in U.S. Pat. No. 4,012,101 (herewith incorporated by reference). In this known electro-optical device, the lens system is moved back and forth along the optical axis by means of a moving coil arranged in an annular air gap of a permanent-magnetic stator. For following the track of a rotating optical disc this known device may be used in combination with one or two pivotal mirrors, which respectively serve for following the track with the radiation spot in a radial direction and for providing compensation for timing errors by moving the radiation spot in a tangential direction. The invention enables this known device to be improved in such a manner that the pivotal mirrors may be dispensed with and is characterized in that the supporting means comprise at least three wires of equal length, which wires extend parallel to and are spaced from the optical axis. The wires may be arranged for example on the underside of the lens system, so that the pretensioning means load the lens system in an upward direction, opposing the force of gravity. The lens system which is thus loaded in an upward direction can be moved along the optical axis as well as in directions perpendicular to the optical axis with high frequency using suitable electromagnetic actuator means.

It has been found that for rapidly mounting the wires in an electro-optical device in accordance with the invention, it may be of advantage to employ an embodiment which is characterized in that said wires, which form part of the supporting means, all form part of a single uninterrupted length of cord comprised of at least one fiber. In this way it is not necessary to manipulate separate lengths of wire during assembly.

In order to obtain a wire which has a very low resistance to bending but which is nevertheless sufficiently strong, an embodiment of the invention may be used which is characterized in that the wires comprise a plurality of separate fibers. In this respect, it may be advantageous to use wires comprised of fibers of a first type and of a second type, the first type of fibers being made of a material which is suitable for the transmission of information signals and the second type of fibers being made of a material which is less elastic than the first material. This is of particular interest if the movable optical system also comprises electronic means or receives a light beam via an optical fiber.

It is essential that the wires have a very low elasticity in the longitudinal direction. Preferably, the wires are made of a material with a modulus of elasticity higher than that of steel. For example, the material may be a hydrocarbon polymer. Excellent results have been obtained by the use of multi-fiber wires, made of the material "KEVLAR.49" which is commercially available from Dupont de Nemours. This material is an aromatic polyamide. Another example is the material "ARENKA", which is available from Akzo B. V. Other promising and suitable materials are, for example, poly para-phenylene-terephtalate and a so-called ultra-strong polythene fibre which has been announced by a manufacturer but which is not yet commercially available. The material "KEVLAR.49" combines a very high tensile strength with a specific mass which is five times as low as that of the steel (1.4 instead of 7.2 kg/cm$^3$), and has a modulus of elasticity which is approximately one and a half times that of steel. This material is available in the form of fibers having a diameter of approximately 12 microns, which fibers are suitable for manufacturing wires of the required thickness having an extremely low elasticity.

Figure 2:
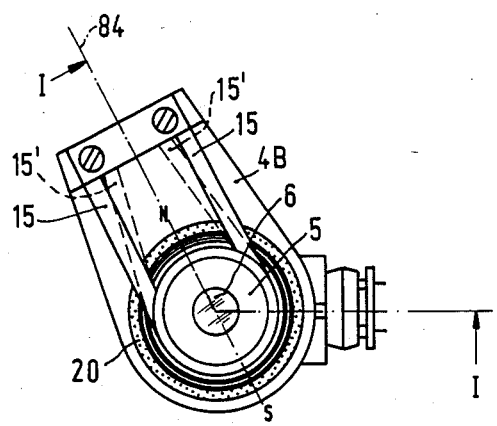
Figure 3:
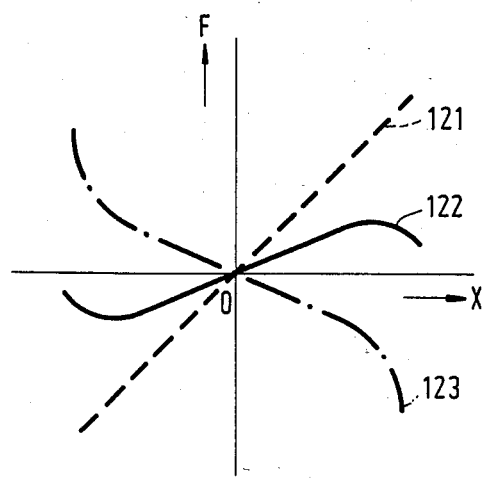
Figure 5:
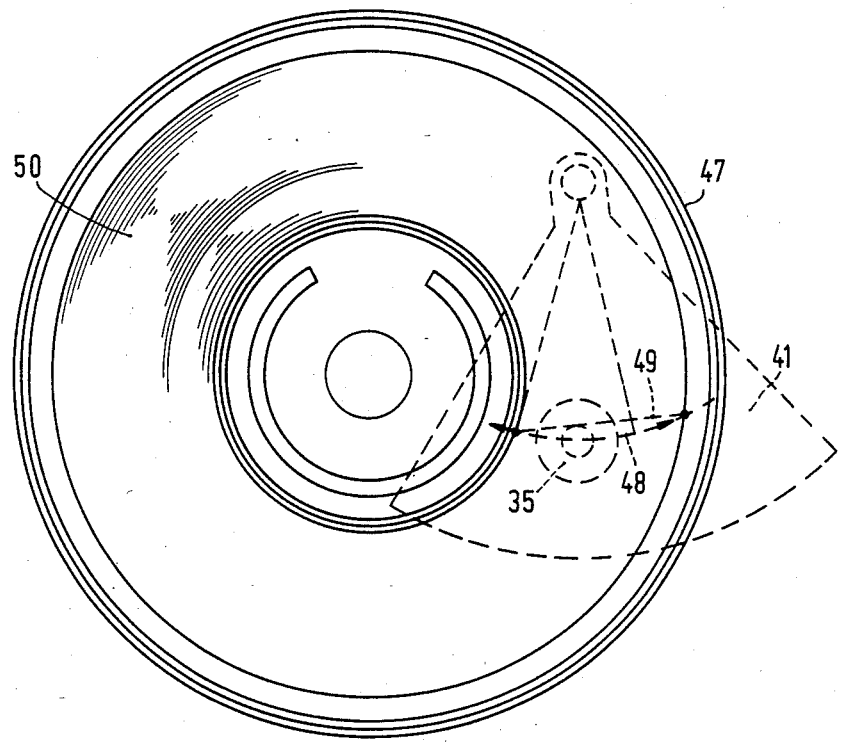
Figure 4:
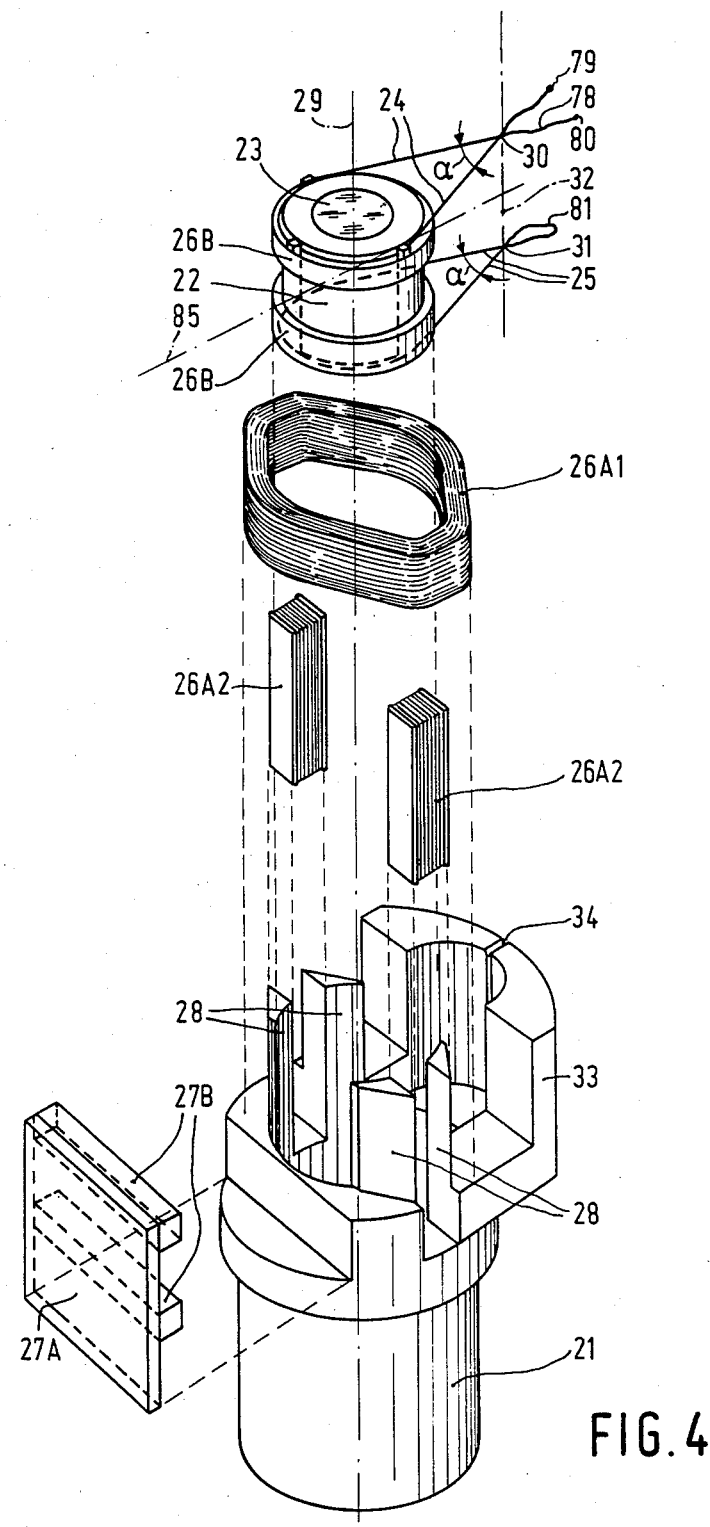
Figures 6, 7:
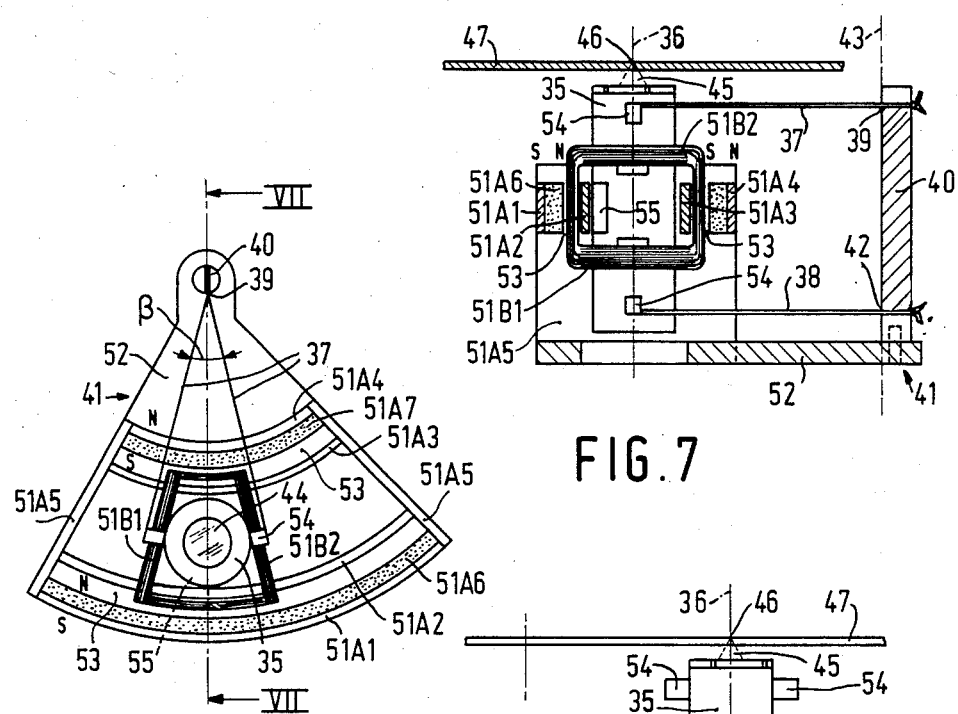
Figure 8:
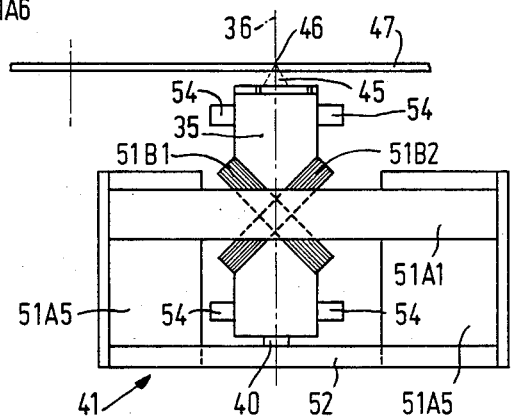
Figure 11:
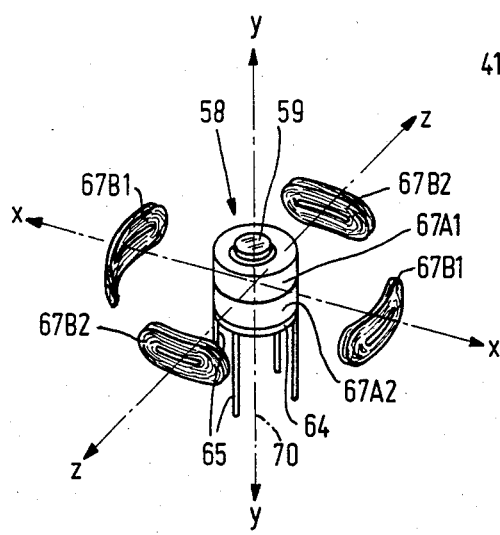
Figure 9:
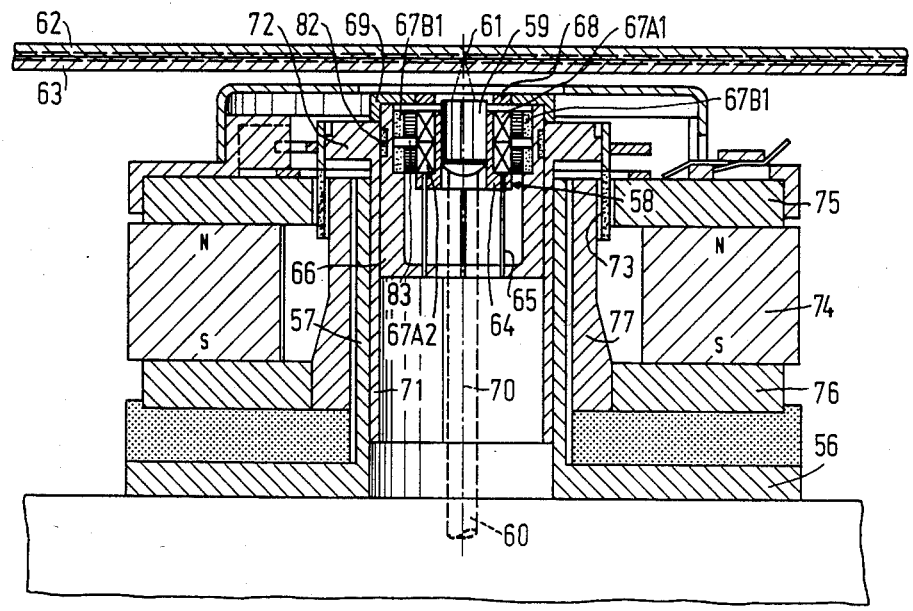
Figure 10:
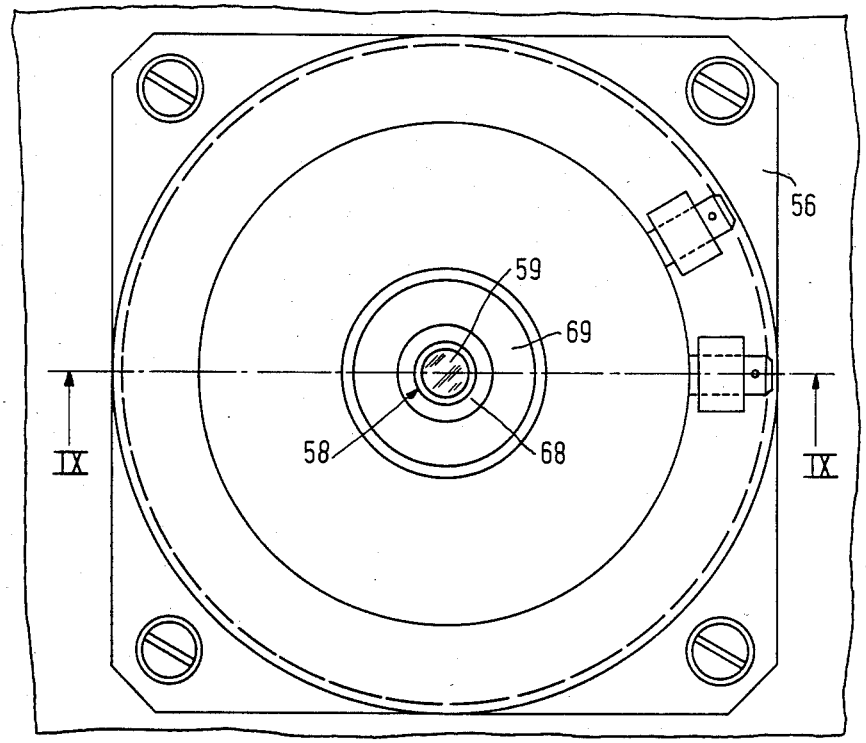

Some embodiments of the invention will now be described in more detail, by way of example, with reference to the drawings, in which:

FIG. 1 shows an electro-optical device in which a moving lens system is suspended in pretensioned leaf springs in a sectional view drawn to an enlarged scale and taken on the line I—I in FIG. 2, FIG. 2 is a plan view of the device shown in FIG. 1, FIG. 3 is a graph depicting the relationship between the axial displacement X of the moving lens system of the electro-optical device shown in FIG. 1 as a function of the axial force F required for this displacement, FIG. 4 is an exploded view, drawn to an enlarged scale, showing a moving lens system suspended in thin wires with a low resistance to bending as an alternative for a part of the electro-optical device shown in FIG. 1, FIG. 5 is a plan view of an optical audio disc drawn to approximately full scale, in which a broken line indicates the outlines of some of the principal parts, situated underneath said disc, of an embodiment of an electro-optical device in accordance with the invention which is capable of scanning the entire area of interest of the disc surface, FIG. 6 is a plan view of the electro-optical device for use in combination with the optical disc shown in FIG. 5, FIG. 7 shows the electro-optical device in a sectional view taken on the line VII—VII in FIG. 6, FIG. 8 is a front view of the electro-optical device shown in FIGS. 6 and 7, FIG. 9 shows a third embodiment of the invention in a cross-sectional view drawn to an enlarged scale, FIG. 10 is a plan view of the electro-optical device shown in FIG. 9, and FIG. 11 is an exploded view showing some parts of the device shown in FIGS. 9 and 10, to illustrate the coil arrangement used.

The electro-optical device shown in FIGS. 1 and 2 is a modification to the device described in the aforementioned U.S. Pat. No. 4,453,241. The device serves for reading an information disc 1 comprising a transparent substrate 2 whose upper surface is provided with an information pattern which is covered with a reflecting layer 3. The disc may be, for example an optical audio disc or video disc. The device includes a frame comprising a tube 4A and a unit 4B arranged on this tube. This unit supports a movable lens system 5 which constitutes the movable part of an objective. It comprises a lens 6, see FIG. 2, and some further lenses, not shown. The device also comprises two stationary lenses 7 and 8 and two beam-splitting prisms 9A and 9B. A semiconductor laser 10 emits a light beam 11 which is focused by the lens system to form a light spot 12 on the information surface of the disc 1. The light beam which has been reflected by the reflecting layer 3 and modulated by the information is reflected as a beam 13 towards a semiconductor diode system 14 by a reflecting surface between the beam-splitting prisms 9A and 9B.

The lens system 5 is movably connected to the frame 4A, 4B by flexible supporting means which are long in comparison with their thickness and which comprise leaf springs 15 and 16. For controlled movement of the lens system, there is provided an electromagnetic actuator comprising first actuator means in the form of a coil 17A on the frame and second actuator means in the form of an annular magnet 17B on the lens system. The coil and magnet cooperate electromagnetically with each other via an air gap 18. With the aid of the electromagnetic actuator, the resiliently suspended optical lens system 5 can effect controlled movements along the optical axis 19 for focusing the light spot 12 on the information surface of the disc 1.

The leaf springs 15 and 16 are pretensioned in their longitudinal directions by means of a magnetic pretensioning device comprising first pretensioning means in the form of an annular magnet 20 arranged on the frame and second pretensioning means in the form of the aforementioned annular magnet 17B arranged on the lens system. The two pretensioning means cooperate magnetically with each other via the air gap 18. The annular magnet 17B is magnetized radially in a manner such that on the upper side and the lower side regions of south polarity S are formed and in the central portion a region of north polarity N is formed. The annular magnet 20 is magnetized in the longitudinal direction of the leaf springs 15 and 16. As is indicated by the letters N and S in FIG. 2, one side of the annular magnet 20 has a region of north polarity and the other side a region of south polarity. As a result of this, the side of north polarity exerts a repelling force on the annular magnet 17B and the side of the south polarity exerts an attractive force, which two forces provide the pretension in the leaf springs.

The annular magnet 20 is magnetized locally but the entire ring is made of magnetizable material, so that the entire ring magnetically cooperates with the annular magnet 17B. This is of influence on the force to be exerted on the lens system 5 for the purpose of focusing. This will be explained with reference to FIG. 3. This Figure shows an XOF system of axes and three curves 121, 122 and 123. The curve 121 is a graph representing the relationship between a displacement X and the axial force F required for the displacement necessary for the deformation of the leaf springs 15 and 16. For small displacements, the force 121 may be regarded as a straight line. The curve 123 graphically represents the relationship between the displacement X and the axial forces exerted on the movable system 5 by the magnetic cooperation of the annular magnet 20 with the annular magnet 17B. The resulting electromagnetic force to which the movable lens system must be subjected by the actuator is represented by the resultant curve 122 obtained by the addition of the curves 121 and 122. This curve is substantially flatter than the curve 121, so that the axial forces required for focusing are smaller than in the absence of the annular magnet 20.

The device shown in FIG. 4 may serve as an alternative to the upper part of the device shown in FIGS. 1 and 2. It comprises a unit 21 which can be arranged on the tube 4A. Further, it comprises a movable lens system comprising a housing 22 with a lens 23 mounted in the housing, flexible supporting means 25 having a length which is great in comparison with their thickness, and an electromagnetic actuator comprising first actuator means in the form of a focusing coil 26A1 and two tracking coils 26A2. Furthermore, there are provided second actuator means in the form of two annular magnets 26B arranged on the lens system 22. The magnetic pretensioning device comprises first pretensioning means comprising a plate 27A and two soft-iron strips 27B. The second pretensioning means, arranged on the lens system, comprise the annular magnets 26B.

The unit 21, which is made of a suitable non-magnetizable material, such as aluminum or plastic, comprises four upwardly extending limbs 28. The two tracking coils 26A2 are each mounted between two of these limbs for example by means of a suitable adhesive. The coil 26A1 is mounted around the limbs 28 and is secured thereto by means of an adhesive. The pretensioning device 27 is also secured by means of an adhesive.

The supporting means comprise two pairs of wires 24 and 25, which extend at least approximately transversely of the optical axis 29 of the movable lens system 22. The first pair 24 extends near a first end of the lens system and the second pair 25 near the other or second end of this system. The wires of each pair 24 or 25 make an angle α with each other. The first pair of wires 24 meet at a first point of attachment 30 and the second pair of wires 25 meet at the second point of attachment 31. The points of attachment are spaced from each other and are situated on a pivotal axis 32 which extends parallel to the optical axis 29 of the lens system 22. The unit 21 has a slot 34 in a wall portion 33. The slot extends parallel to the optical axis 29. The wires 24 and 25 extend through the slot and are secured to the wall portion 33 at the location of the points of attachment 30 and 31 by means of an adhesive.

The permanent magnets 26B are magnetized axially in such a manner that they face each other with like poles. Owing to the presence of the tracking coil 26A2, the objective is movable along the optical axis 29 and can also perform electrically controlled pivotal movements about the pivotal axis 32. This is distinct from the device shown in FIGS. 1 and 2, in which the lens system 5 is capable of performing movements only along the optical axis 19. This enables the device shown in FIG. 4 to be mounted in a swinging arm or in a slide which can be translated radially of the axis of rotation of an optical disc and which roughly follows the track to be scanned. Small deviations in the radial position of the track can be followed by correction movements of the lens system 22 about the pivotal axis 32.

The oblique arrangement of the wires 24 and 25 respectively relative to each other has an important additional advantage in comparison with wires which, in the same way as the leaf springs 15 and 16 in FIGS. 1-2, extend parallel to each other in pairs. When the lens system 5 in FIGS. 1-2 is tilted about the axis 84, which extends through and is perpendicular to the optical axis 19 and also parallel to the leaf springs 15 and 16, the springs 15 and 16 are subjected exclusively to a bending load. When the lens system 22 shown in FIG. 4 is tilted about the corresponding axis 85, however, two of the four wires (one upper wire and one lower wire which does not extend parallel to this upper wire) are always subjected to tensile forces. This is because the vector of the movement of the point where the relevant wire is connected to the lens system does not extend perpendicularly to the wire. The other two wires would have to be subjected to a compressive force which is equal but opposite to the tensile force. Since the wires are pretensioned, the tensile force produced in two wires by the pretensioning means increases and that produced in the other two wires decreases. Since wire with a low resistance to bending cannot take up any compressive force, the lens system can be tilted about the axis 85 when a tilting moment is exerted of such a magnitude that the tensile force in two of the wires has decreased to zero. The magnitude of this critical moment required depends on the magnitude of the pretensioning foces applied to the wires and the magnitude of the angle $\alpha$. If the wires are parallel, the required critical tilting moment is in principle zero, so that there is no resistance to tilting at all.

If will be evident from the foregoing that the device shown in FIGS. 1-2 can be improved if the leaf springs 14 and 15 are not arranged in parallel but, for example as is indicated in broken lines in FIG. 2 for two alternative springs 15'. At their ends which are remote from the lens system 5, these springs may be arranged so that they do not converge, as shown, but that they diverge.

The improvement in resistance to tilting as explained in the foregoing can also be obtained in devices which, in contradistinction to the device in accordance with the invention, do not include pretensioning means. For example, the improvement obtained in the device shown in FIGS. 1-2 remains even if the annular magnet 20 is dispensed with. Instead of lead springs it is also possible to use springs of a different, for example circular, cross-section. The resistance to tension and compression, however, is always higher than the resistance to bending, because of the comparatively great length of the supporting means in comparison with their thickness.

FIGS. 5 to 8 show an important embodiment of the invention. This electro-optical device resembles the device shown in FIG. 4 with respect to the supporting arrangement for the lens system. However, in principle it is suitable both for radial tracking and for carrying out the required correction movements in a radial direction. It comprises a lens system 35 with an optical axis 36 and the supporting means again comprise wires 37 and 38 arranged in pairs and extending transversely of the optical axis, the first pair 37 extending near a first end and the second pair 38 near a second end of the lens system 35. The wires of each pair make an angle $\beta$ with each other. The first pair of wires 37 meet at a first point of attachment 39 on a column 40 of a frame 41. The second pair of wires 38 meet at a second point of attachment 42 on the column 40. These two points of attachment are spaced from each other on the pivotal axis 43 which extends parallel to the optical axis 36 of the lens system 35. It is not strictly necessary that the angles between the wires of the one pair and the other pair are both $\beta$. Sometimes it may be advantageous or necessary to give these angles different values. In the present embodiment the lens system, in addition to the lens 44 and possible further lenses, also comprises a radiation source and all the other optical and opto-electronic parts necessary for concentrating and focusing a a radiation beam 45 so as to form a radiation spot 46 and for receiving the reflected radiation modulated by the information on an optical disc 47 and converting this information into an electrical modulation. The lens system 35 may comprise for example the parts present in the device shown in FIGS. 1-2. The lens system 35 may therefore be regarded as a moving integrated electro-optical scanning unit. It is pivotable about the pivot axis 43 along an arc 48 whose cord 49, see FIG. 5, has a length which is at least equal to the diameter of the annular information area 50 of the information disc 47 to be read. The lens system thus is capable of moving along the entire path necessary for reading the information. The suspension by means of the wires 37, 38 is the only supporting arrangement which is required. This arrangement is capable of producing both the focusing movements along the optical axis 36 and the pivotal movements about the pivotal axis 43 for following the track on the disc.

The actuator means comprise first actuator means 51A which are arranged on the frame 41 along an arc whose centre of curvature is situated on the pivotal axis 43. The second actuator means 51B cooperate with the first actuator means via an at least substantially constant air gap 53, regardless of the pivotal position of the lens system 35.

The first actuator means 51A comprise four bent soft-iron strips 51A1 to 51A4 and two soft-iron side plates 51A5. Further, they comprise two permanent magnets 51A6 and 51A7 which are magnetized radially of the pivotal axis 43. The second actuator means 51B comprise two crosswire arranged coils 51B1 and 51B2 on the lens system 35. The direction of magnetization of the magnets 51A6 and 51A7 is indicated in FIGS. 6 and 7 by the letters N and S, symbolizing north polarity and south polarity respectively. The lens system 35 is driven along the optical axis 36 by energizing the two coils in phase. Pivotal movements about the pivotal axis 43 can be obtained by energizing the coils in phase opposition.

For the fixation of the wires 37 and 38 the lens system 35 is provided with four mounting blocks 54. The wires are secured to these blocks by means of a suitable adhesive. The column 40 of the frame is formed with slots on both ends in which slots the wires are also fixed by means of an adhesive.

The magnetic pretensioning means comprises first pretensioning means in the form of the iron strip 51A2 on the frame, which strip forms part of the first actuator means, and second pretensioning means in the form of a permanent-magnetic plate 55 on the lens system 35. These means cooperate magnetically with each other via the air gap formed between them. Thus, the wires 37 and 38 are pretensioned in a longitudinal direction in a contactless manner.

The embodiment of the invention shown in FIGS. 9 and 10 is a modification of an electro-optical device described in U.S. Pat. No. 4,021,101 (herewith incorporated by reference). The frame comprises a base plate 56 which is provided with a cylindrical sleeve 57. The movable optical system comprises a lens system 58, which has only one optical element 59. This element is an aspherical lens which serves for focusing a light beam 60 to form a light spot 61 for scanning the information contained in an information surface 62 of an optical disc 63. The lens has an optical axis 61.

The lens system further comprises a mounting 64 for the lens 59. By means of four flexible wires 65 the system is movably supported on a support 66.

An electromagnetic actuator comprises first actuator means 67A1 and 67A2 in the form of two permanent-magnetic rings which are axially magnetized in opposite directions, and two pairs of coils 67B1 and 67B2 which cooperate therewith via an annular air gap. The wires 65 are pretensioned by pretensioning means which cooperate via an air gap and which comprise a ferromagnetic ring 68 arranged in a cap 69 and the annular magnet 67A1. With the aid of the actuator means the optical system 58 is movable along translation axes XX and ZZ, see FIG. 11. For focusing the light spot 61 on the information surface 62 the entire lens system is also bodily movable along the optical axis 70 along the axis YY in FIG. 11. For this purpose the support 60 is arranged in a cylinder 71, which is axially slidable in the sleeve 57. The upper end of the cylindre 71 is provided with a flange 72 which carries an annular focusing coil 73. This coil is axially movable in an annular gap of a permanent-magnetic stator comprising an axially magnetized annular magnet 74, end plates 75 and 76, and a central portion 77.

The wires 65 have equal lengths and extend parallel to the optical axis 70. Movements of small amplitude in the XX direction and the ZZ direction may therefore be regarded as translations. By means of the electrooptical device shown in FIGS. 9 and 10 the radiation spot 71 can be kept automatically in focus on the information surface 62 and by means of the lens system 58 it is also possible to perform the rapid correction movements in the XX and ZZ directions necessary for correcting the position relative to the track and for correcting timing errors in the track.

In addition to the permanent-magnetic pretensioning means 67A1 and 68 there are provided electromagnetic pretensioning means. These means comprise an annular pretensioning coil 82 and the two actuator magnets 67A1 and 67A2. The pretensioning coil 82 enables wires 65 to be subjected to tensile forces whose magnitude depends on the applied current. The pretensioning coil is arranged in series with the focusing coil 73 and can be dimensioned so that little or no variations in the tensile force occur in the wires 65 in the case of accelerated or decelerated movements of the lens system along the optical axis. Variations of the pretensioning forces in the wires as a result of varying intertial forces exerted on the wires by the lens system 58 are thus compensated for by opposite corrections of substantially the same magnitude. The result is that the pretension of the supporting means does not vary, or at least varies to a smaller extent, despite the fact that the lens system performs rapid focusing movements along the optical axis. This is an application of a principle which forms the subject of European Patent Application No. 0118626, corresponding to U.S. Pat. No. 4,504,935 (herewith incorporated by reference), which has not yet been published.

In principle the ferromagnetic ring 68 may be dispensed with, the pretensioning forces in the wires then being generated exclusively by means of the electromagnetic pretensioning means. The arrangement of the pretensioning coil 82 in series with the focusing coil then requires special steps. This is because the electric current to be applied to the pretensioning coil should comprise a d.c. component for generating a constant pretension in the wires 65, and a variable component, for generating the correction forces, which variable component is superimposed on said d.c. component and which is a function of the current in the focusing coil.

In an embodiment of the invention in which the supporting means comprise a plurality of wires, for example as in the embodiments shown in FIGS. 4 to 11, it is sometimes possible to form all the wires from a single continuous length of wire. This may substantially simplify mounting of the wires. In FIG. 4 an attempt has been made to indicate how the wires 24 and 25 can be formed by means of a single length of wire 78 having ends 79 and 80. The wire 78 is arranged on the optical system 22 as indicated by the broken lines. The parts of the length of wire 78 which do not form part of the supporting means 24 and 25 are secured to the optical system 22 by means of a suitable adhesive. It has been found that in this way the wires 24 and 25 can be readily formed by means of a simple tool. The ends 79 and 80 of the wires 24 and the looped portion 81 at the location of the point of attachment 31 of the wires 25 are secured in the slot 34 in the wall portion 33 by means of an adhesive. In the embodiment shown in FIGS. 5 to 8 the supporting means are constructed in the same way.

For an optimum flexibility the wires are made of a plurality of separate fibers. Some experience has been gained with the embodiment shown in FIG. 4 using wires manufactured from an aromatic polyamide, available from DuPont de Nemours under the trade-name "KEVLAR.49". The diameter of the individual fibers is 12 microns and the length of wire 78 comprises ten such fibers. For the embodiments shown in the drawing it is not indicated how the electrical or optical signals can be transmitted between the movable part of the device and the stationary parts. Sometimes, as in the embodiment shown in FIGS. 5 to 8, it is also necessary to apply electric power to the moving part of the device. The moving part of the device may be connected to the stationary parts in a customary manner by means of moving wires or by means of a flexible foil with a pattern of electrical conductors. In the embodiment shown in FIGS. 1 and 2, in which the supporting means comprise metal leaf springs 15 and 16, the coil 17B can be driven by signals applied via the springs. If the supporting means comprise wires with a plurality of fibres it is possible to employ fibres of a first and a second type, the first type being made of a material suitable for transmitting information signals and the second type being made of a material which is less elastic than the first material. The first material may be for example a metal, for transmitting electric signals or an electric current, or an optical material for transmitting optical signals. The high elasticity of these materials has no function in supporting the optical system, because the supporting function is provided by the fibres of the second material.

Preferably, in embodiments of the invention in which the supporting means comprise wires, the wires are made of a material with a modulus of elasticity higher than that of steel. Preferably, this material is a hydrocarbon polymer such as the afore-mentioned "KEVLAR.49". Such materials exhibit practically no elasticity, so that a very stable supporting arrangement for the optical system is obtained, which combines an extremely low mass of the supporting means with a very high flexibility thereof in the relevant direction of movement or the relevant directions of movement of the optical system.

Within the scope of the invention as defined by the claims various other embodiments are possible. The movable optical system need not comprise a lens system but may for example comprise a mirror or other optical elements. The pretensioning means need not comprise actuator means but may comprise exclusively means having no other function than pretensioning the supporting means.

The supporting means need not comprise leaf springs or wires. Instead of this, arms may be employed whose ends are pivotally secured. If it is necessary to drive the movable optical system in accordance with more than two degrees of freedom, it may be advantageous if the supporting arrangement comprises only one elonage pretensioned supporting means.

What is claimed is:

1. An electro-optical device for scanning an information disc without mechanical contact, which device comprises:
   a movable optical system comprising at least one optical element,
   supporting means which movably support the optical system and which are long in relation to their thickness, and
   an electromagnetic actuator comprising first actuator means and second actuator means which cooperate electromagnetically with each other via an air gap for moving the optical system in a controlled fashion, and a magnetic pretensioning device comprising first pretensioning means and second pretensioning means, which first and second pretensioning means cooperate magnetically with one another via an air gap and pretension said supporting means in the longitudinal direction.

2. An electro-optical device as claimed in claim 1, wherein the magnetic pretensioning device comprises permanent-magnetic means.

3. An electro-optical device as claimed in claim 1, wherein at least a part of the pretensioning means also form part of the actuator means.

4. An electro-optical device as claimed in claim 1, wherein said supporting means comprise at least one guy having a low resistance to bending.

5. An electro-optical device as claimed in claim 4, wherein said optical system comprises a lens system with an optical axis, and
   the supporting means comprise a first and second pair of guys which extend at least substantially transversely of the optical axis, said first pair extending near a first end and said second pair extending near a second end of the lens system, and wherein
   the guys of each pair are disposed at an angle to one another.

6. An electro-optical device as claimed in claim 5, wherein
   the guys of said first pair meet at a first point of attachment
   the guys of said second pair meet at a second point of attachment, and
   the first and second points of attachment are spaced from each other and are situated on a pivotal axis which is parallel to the optical axis of the lens system.

7. An electro-optical device as claimed in claim 6, wherein
   the lens system is pivotable about the pivotal axis along an arc whose cord has a length which is at least equal to the diameter of the annular information area of the information disc to be read, and
   the actuator means have the shape of an arc whose center of curvature is situated on the pivotal axis and cooperate with the second actuator means via an at least substantially constant air gap regardless of the pivotal position of the lens system.

8. An electro-optical device as claimed in claim 4, wherein said optical system comprises a lens system with an optical axis, the supporting means comprise at least three guys of equal length, which guys extend parallel to and are spaced from the optical axis.

9. An electro-optical device as claimed in claim 4, wherein said guy comprises a plurality of separate fibers.

10. An electro-optical device as claimed in claim 9, wherein said guy is comprised of at least one fiber of a first type and at least one fiber of a second type, the first type of fiber being made of a first material which is suitable for the transmission of information signals and the second type of fiber being made of a material which is less elastic than the first material.

11. An electro-optical device as claimed in claim 4, wherein said guy is comprised of a material with a modulus of elasticity higher than that of steel.

12. An electro-optical device as claimed in claim 11, wherein said material is a hydrocarbon polymer.

13. An electro-optical device as claimed in claim 4, wherein said supporting means comprises a plurality of said guys formed from a single, continuous cord comprised of at least one fiber.

14. An electro-optical device for scanning an information disc, said device comprising a frame, an optical system for converging a beam of radiation to a spot along an optical axis, said optical system comprising a housing and at least one lens mounted in said housing, means for supporting said optical system in said frame for movement at least in an axial direction which is generally parallel to said optical axis, said supporting means comprising a plurality of flexible guys having a low resistance to bending, one end of each of said guys being secured to said housing and the other end of each of said guys being secured to said frame so that said guys extend between said housing and said frame, said supporting means further comprising means for pretensioning said guys in the longitudinal direction thereof so that said optical system is supported at a predetermined position in said frame by said guys, and means for moving said optical system relative to said frame in said axial direction.

15. The device as claimed in claim 14, wherein said pretensioning means includes magnetic means comprising a first member secured to said housing and a second member secured to said frame at positions relative to said guys such that said first and second members exert a magnetic force through an air gap therebetween which pretensions said guys.

16. The device as claimed in claim 14 or 15 including electromagnetic means for moving said optical system in a direction which is generally perpendicular to said optical axis.

17. The device as claimed in claim 14 or 15, wherein said supporting means comprises a first pair of guys and a second pair of guys, said guys of each pair extending at an angle with each other and meeting at a point of attachment on said frame, said points of attachment of said first and second pair being spaced from each other along a line which is parallel to said optical axis, said other ends of said guys of each pair being secured to opposite sides of said housing at locations such that said guys of each pair are disposed in a respective plane which is generally perpendicular to said optical axis.

18. The device as claimed in claim 17 including electomagnetic means for pivoting said optical system about said line.

* * * * *